(12) United States Patent
Lin

(10) Patent No.: US 6,996,333 B1
(45) Date of Patent: Feb. 7, 2006

(54) FAN SPEED CONTROL

(75) Inventor: George Lin, Taipei (TW)

(73) Assignee: Mita Top Technology Co., LTD, Taipei (TW)

( * ) Notice: Subject to any disclaimer, the term of this patent is extended or adjusted under 35 U.S.C. 154(b) by 271 days.

(21) Appl. No.: 10/663,004

(22) Filed: Sep. 15, 2003

(51) Int. Cl.
*H02P 5/00* (2006.01)

(52) U.S. Cl. ............... 388/800; 388/805; 388/814; 318/254; 318/138; 318/439; 62/228.1; 62/228.4

(58) Field of Classification Search .............. 388/800, 388/805, 812, 814, 907.5; 318/138, 254, 318/461, 268; 62/228.1, 228.4
See application file for complete search history.

(56) References Cited

U.S. PATENT DOCUMENTS

| | | | | |
|---|---|---|---|---|
| 5,159,255 A | * | 10/1992 | Weber | 318/775 |
| 5,299,432 A | * | 4/1994 | Nakae et al. | 62/298 |
| 5,528,114 A | * | 6/1996 | Tokizaki et al. | 318/67 |
| 5,688,422 A | * | 11/1997 | Landwehr et al. | 219/491 |
| 5,738,496 A | * | 4/1998 | Mehta | 417/44.1 |
| 5,829,264 A | * | 11/1998 | Ishigaki et al. | 62/228.3 |
| 6,548,983 B2 | * | 4/2003 | Avella et al. | 318/599 |

* cited by examiner

*Primary Examiner*—Rina Duda
(74) *Attorney, Agent, or Firm*—Pro-Techtor Int'l Services

(57) ABSTRACT

A fan speed control includes a power adapter, a CPU programmed with a phase splitting program, a current-limit resistor, a capacitor, a TRIAC, and a switch module, the CPU having a signal input terminal connected in series to the power input terminals of the power adapter through the current-limit resistor to obtain synchronous signal frequency as input signal, a signal output terminal connected in series to the capacitor and then the gate of the TRIAC for enabling the CPU to control triggering of the TRIAC, the TRIAC having the gate connected in series to the capacitor, and the anode and cathode respectively connected to the fan motor and the power output terminal of the power adapter, so that the fan motor, the TRIAC and the power adapter form a loop in which the TRIAC controls the operation speed of the fan motor; the switch module having one end connected to the control input terminal of the CPU for controlling the output state of the signal output terminal of the CPU and the other end connected to the power output terminal of the power adapter.

6 Claims, 5 Drawing Sheets

FAN SPEED CONTROL

BACKGROUND OF THE INVENTION

1. Field of the Invention

The present invention relates to electric fans and, more specifically, to a fan speed control fur use in an electric fan to control the operation speed of the fan motor, which has a simple circuit structure that is highly reliable and inexpensive to manufacture.

2. Description of the Related Art

Conventional fan speed control devices for electric fans commonly include tow types, namely, the mechanical type and the electronic type. Conventional mechanical fan speed controls commonly use a press-button switch or rotary switch to control shift contacts of the fan motor. The user needs to press the press-button switch or rotate the rotary switch to the desired speed position when changing the speed of the fan. Conventional electronic fan speed controls commonly comprise an electronic fan speed control circuit installed in the electric circuit of the fan, and a touch-control or remote-control panel disposed at the base of the fan for enabling the user to drive the fan speed control circuit to change the speed of the fan motor. The conventional mechanical type and electronic type fan speed control devices are commonly complicated, resulting in a high manufacturing cost.

SUMMARY OF THE INVENTION

The present invention has been accomplished under the circumstances in view.

It is the main object of the present invention to provide a fan speed control for controlling the operation speed of the fan motor of a fan, which has a simple circuit structure that is highly reliable and inexpensive to manufacture.

To achieve this and other objects of the present invention, the fan speed control comprises A fan speed control comprised of a power adapter, a CPU, a current-limit resistor, a capacitor, a TRIAC, and a switch module, and installed in a fan for controlling the operation speed of the fan motor of the fan; wherein the power adapter has at least two power input terminals and one power output terminal, the at least two power input terminals being coupled to AC power source and electrically connected to one end of the fan motor to provide the fan motor with the necessary working power, the power output terminal being electrically coupled to the CPU to provide the CPU with the necessary working voltage; the CPU has at least one signal input terminal, one control input terminal, one signal output terminal, and a phase splitting program programmed therein, the signal input terminal being electrically connected in series to the power input terminals of the power adapter through the current-limit resistor to obtain synchronous signal frequency as input signal, the signal output terminal being connected in series to the capacitor and then the gate of the TRIAC for enabling the CPU to control triggering of the TRIAC; the TRIAC has the gate connected in series to the capacitor, and the anode and cathode respectively connected to the fan motor and the power output terminal of the power adapter, so that the fan motor, the TRIAC and the power adapter form a loop in which the TRIAC controls the operation speed of the fan motor; the switch module has one end connected to the control input terminal of the CPU for controlling the output state of the signal output terminal of the CPU, and an opposite other end connected to the power output terminal of the power adapter.

DETAILED DESCRIPTION OF THE PREFERRED EMBODIMENT

Figure 1:
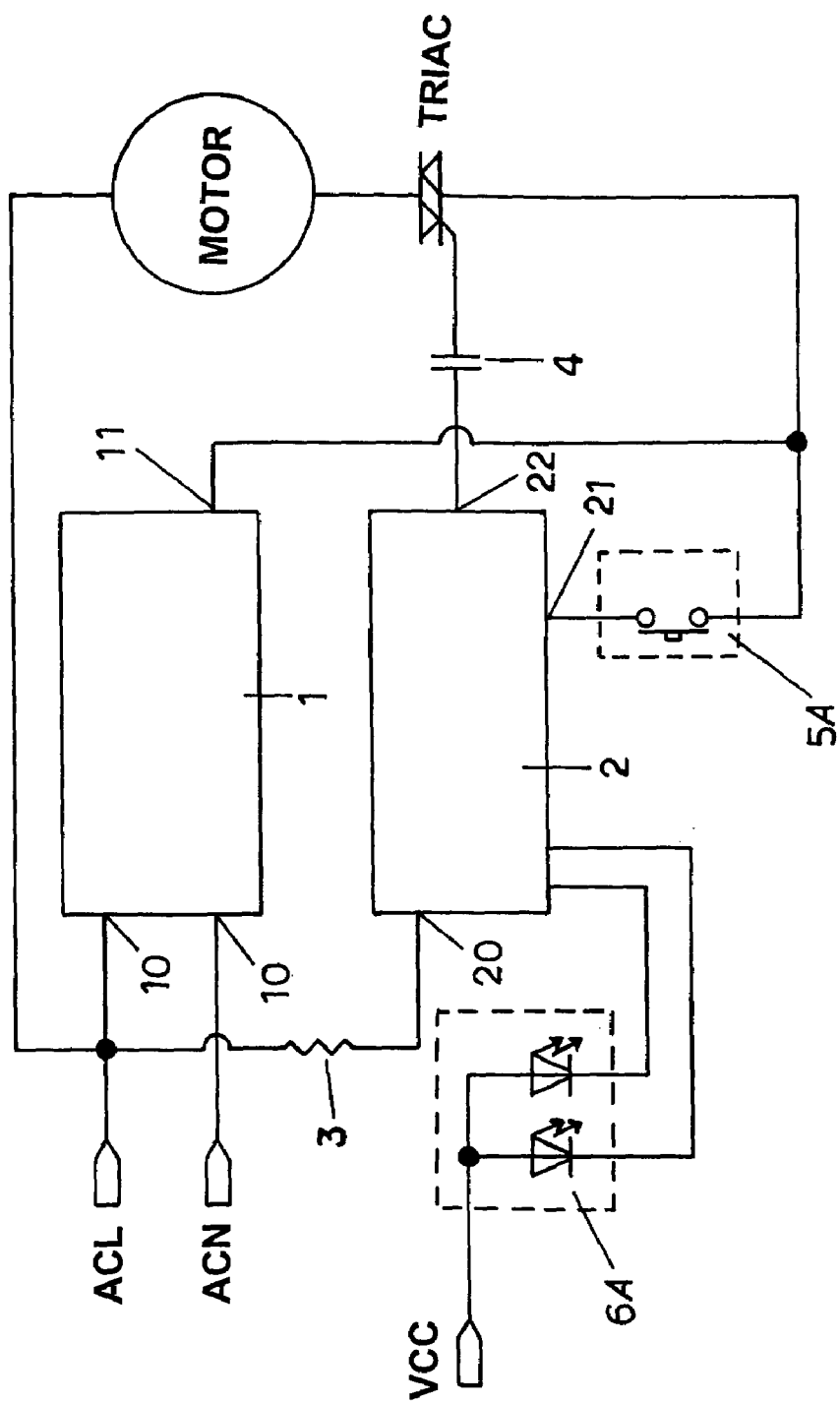
FIG. 1 is a circuit diagram of a fan speed control according to the first embodiment of the present invention.

Referring to FIG. 1, a fan speed control in accordance with the first embodiment of the present invention is shown comprising a power adapter 1, a CPU (central processing unit) 2, a current-limit resistor 3, a capacitor 4, a TRIAC, and a switch module.

The power adapter 1 has at least two power input terminals 10 and one power output terminal 11. The power input terminals 10 are coupled to AC power source (for example, AC 110 V city power supply), and electrically connected to one end of the fan motor MOTOR to provide the fan motor with the necessary working power. The power output terminal 11 is electrically coupled to the CPU 2 to provide the CPU 2 with the necessary working voltage. The CPU 2 has at least one signal input terminal 20, one control input terminal 21, and one signal output terminal 22. The signal input terminal 20 is electrically connected in series to the power input terminals 10 of the power adapter 1 through the current-limit resistor 3 to obtain synchronous signal frequency (for example 50 Hz or 60 Hz) as input signal. The CPU 2 has programmed therein a phase splitting program. The signal output terminal 22 is connected in series to the capacitor 4 and then the gate of the TRIAC, so that the CPU 2 controls triggering of the TRIAC.

The switch module may be variously embodied to provide different switch control modes.

(1) FIG. 1 shows a first example of the switch module. According to this embodiment, the switch module is a single-button two-speed (High and Low) switch module 5A matching with a dual-light display module 6A (High and Low indicator LEDs).

Figure 2:
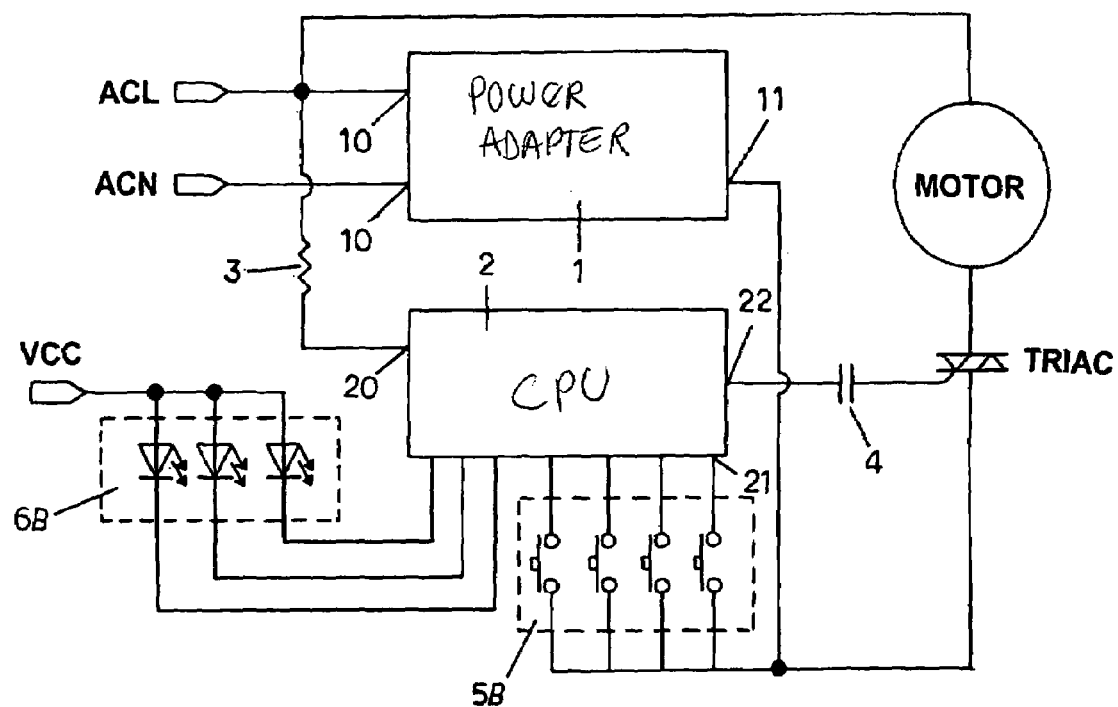
FIG. 2 is a circuit diagram of a fan speed control according to the second embodiment of the present invention.

(2) FIG. 2 shows a second example of the switch module. According to this embodiment, the switch module is a 4-button three-speed (High, Medium, and Low) and one OFF switch module 5B matching with a three-light display module 6B (High, Medium, and Low indicator LEDs).

Figure 3:
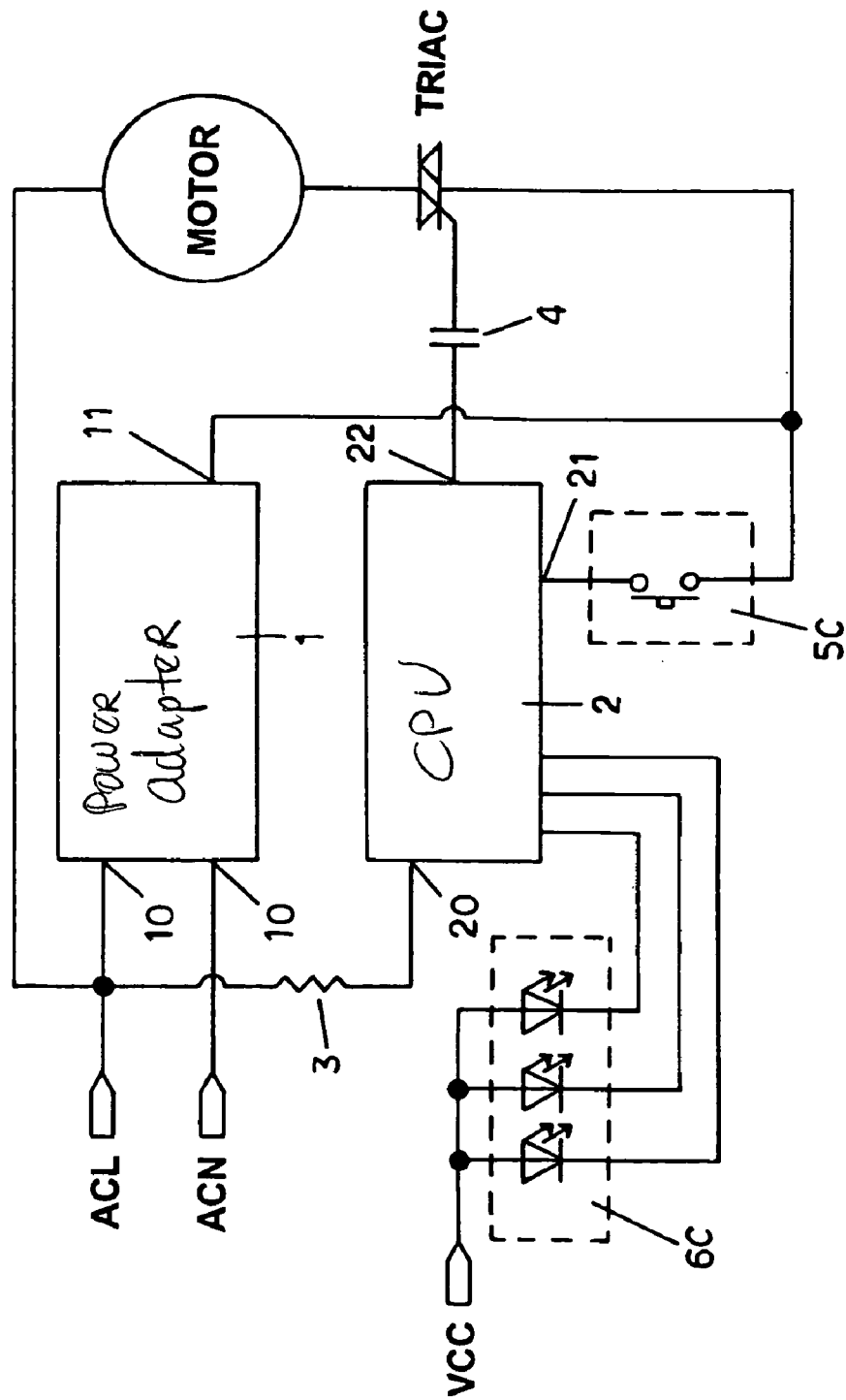
FIG. 3 is a circuit diagram of a fan speed control according to the third embodiment of the present invention.

(3) FIG. 3 shows a third example of the switch module. According to this embodiment, the switch module is a single-button three-speed (High, Medium, and Low) and one OFF switch module 5C matching with a three-light display module 6C (High, Medium, and Low indicator LEDs).

Figure 4:
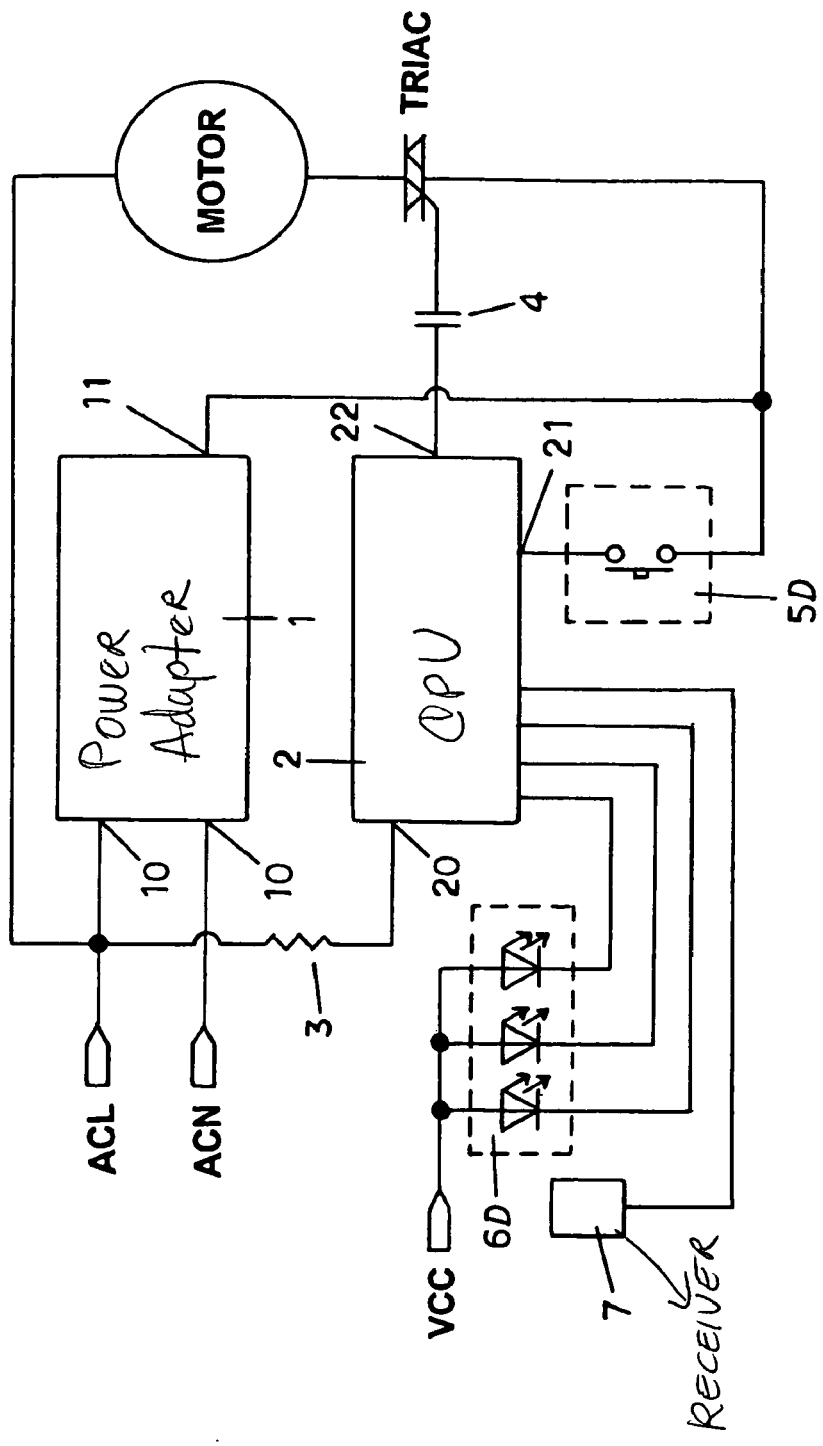
FIG. 4 is a circuit diagram of a fan speed control according to the fourth embodiment of the present invention.

(4) FIG. 4 shows a fourth example of the switch module. According to this embodiment, the switch module is a single-button three-speed (High, Medium, and Low) switch module 5D matching with a three-light display module 6D (High, Medium, and Low indicator LEDs) and a remote-control receiver 7 adapted to receive control signal from a remote controller (not shown).

Figure 5:
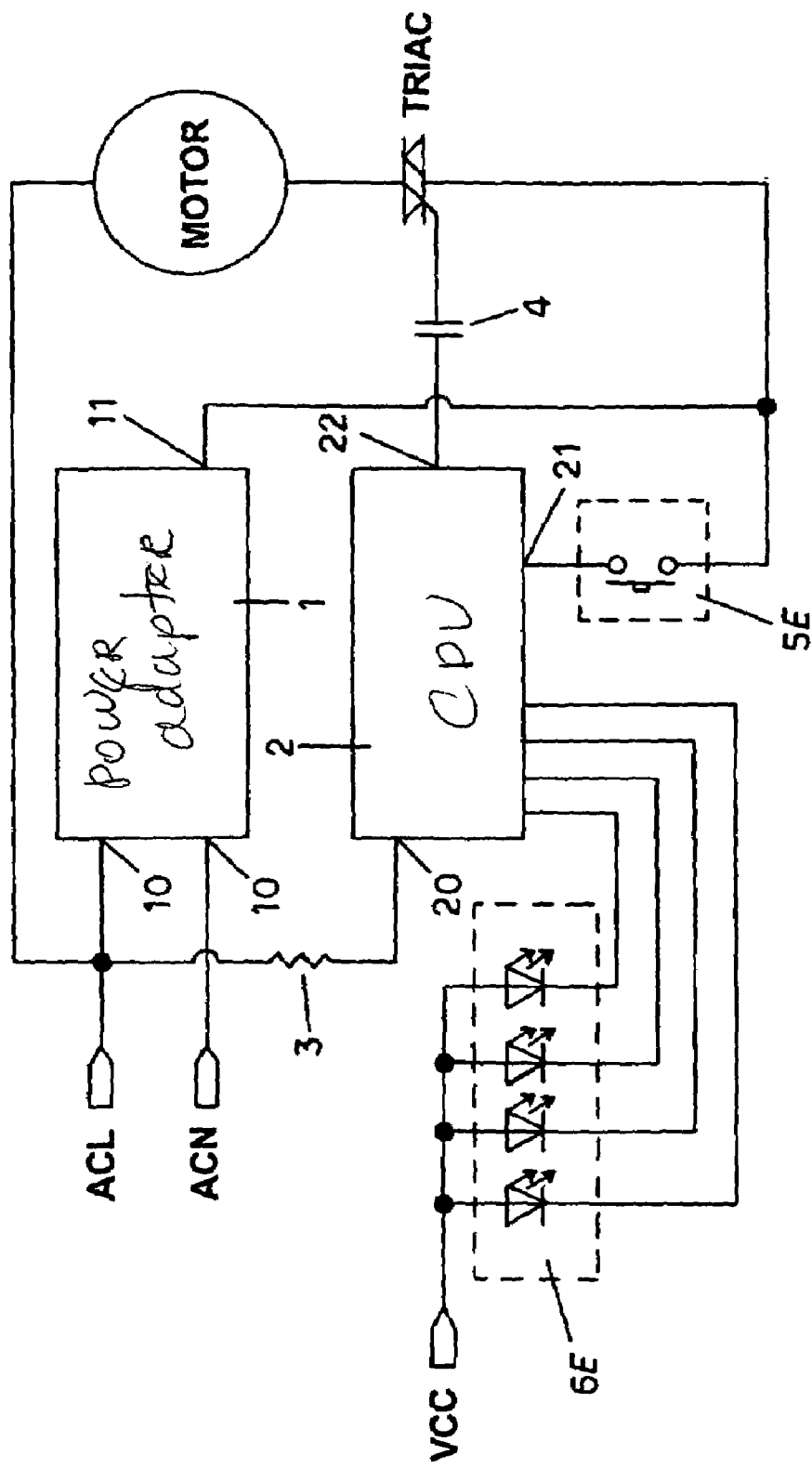
FIG. 5 is a circuit diagram of a fan speed control according to the fifth embodiment of the present invention.

(5) FIG. 5 shows a fifth example of the switch module. According to this embodiment, the switch module is a single-button four-speed (High, Medium, Low, and Natural-wind) switch module 5E matching with a four-light display module 6E (High, Medium, Low, and Natural-wind indicator LEDs).

The aforesaid TRIAC has the gate connected in series to the capacitor 4, and the anode and cathode respectively connected to the fan motor MOTOR and the power output terminal 11 of the power adapter 1. Therefore, the fan motor MOTOR, the TRIAC and the power adapter 1 form a loop in which the TRIAC controls the operation speed of the fan motor MOTOR. The switch module 5A~5E has one end connected to the control input terminal 21 of the CPU 2 for controlling the output state of the signal output terminal 22 of the CPU 2, and the other end connected to the power output terminal 11 of the power adapter 1.

By means of the switch module 5A~5E, the CPU 2 triggers the TRIAC to drive the fan motor MOTOR subject to the desired speed level.

According to the aforesaid description, the invention does not require a complicated circuit design, thereby effectively reducing the manufacturing cost. Using a TRIAC to control variation of power at the fan motor (i.e., variation of fan speed) is highly reliable. Comparing to conventional mechanical or electronic type fan speed control devices, the fan speed control of the present invention is simple, reliable, and inexpensive.

A prototype of fan speed control has been constructed with the features of FIGS. 1~5. The fan speed control functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A fan speed control comprised of a power adapter, a CPU (central processing unit), a current-limit resistor, a capacitor, a TRIAC, and a switch module, and installed in a fan for controlling the operation speed of the fan motor of said fan; wherein:

said power adapter has at least two power input terminals and one power output terminal, said at least two power input terminals being coupled to AC power source and electrically connected to one end of said fan motor to provide the fan motor with the necessary working power, said power output terminal being electrically coupled to said CPU to provide said CPU with the necessary working voltage;

said CPU has at least one signal input terminal, one control input terminal, one signal output terminal, and a phase splitting program programmed therein, said signal input terminal being electrically connected in series to the power input terminals of said power adapter through said current-limit resistor to obtain synchronous signal frequency as input signal, said signal output terminal being connected in series to said capacitor and then the gate of said TRIAC for enabling said CPU to control triggering of said TRIAC;

said TRIAC has the gate connected in series to said capacitor, and the anode and cathode respectively connected to said fan motor and the power output terminal of said power adapter, so that said fan motor, said TRIAC and said power adapter form a loop in which said TRIAC controls the operation speed of said fan motor;

said switch module has one end connected to the control input terminal of said CPU for controlling the output state of the signal output terminal of said CPU, and an opposite other end connected to the power output terminal of said power adapter.

2. The fan speed control as claimed in claim 1, wherein said switch module is a single-button two-speed (High and Low) switch module matching with a display module having a high-speed indicator light and a low-speed indicator light.

3. The fan speed control as claimed in claim 1, wherein said switch module is a 4-button three-speed (High, Medium, and Low) and one OFF switch module matching with a display module, said display module comprising a high-speed indicator light, a medium-speed indicator light, and a low-speed indicator light.

4. The fan speed control as claimed in claim 1, wherein said switch module is a single-button three-speed (High, Medium, and Low) and one OFF switch module matching with a display module, said display module comprising a high-speed indicator light, a medium-speed indicator light, and a low-speed indicator light.

5. The fan speed control as claimed in claim 1, wherein said switch module is a single-button three-speed (High, Medium, and Low) switch module matching with a display module and a remote-control receiver, said display module comprising a high-speed indicator light, a medium-speed indicator light, and a low-speed indicator light, said remote-control receiver being adapted to receive control signal from a remote controller for driving said CPU to control the operation speed of said fan motor via said TRIAC.

6. The fan speed control as claimed in claim 1, wherein said switch module is a single-button four-speed (High, Medium, Low, and Natural-wind) switch module matching with a display module, said display module comprising a high-speed indicator light, a medium-speed indicator light, a low-speed indicator light, and a natural-wind indicator light.

* * * * *